(12) United States Patent
Cano et al.

(10) Patent No.: US 11,220,057 B2
(45) Date of Patent: Jan. 11, 2022

(54) AIRFLOW COMPONENT

(71) Applicant: HEWLETT-PACKARD DEVELOPMENT COMPANY, L.P., Houston, TX (US)

(72) Inventors: Emilio Carlos Cano, Rubi (ES); Oriol Borrell Carbonell, Sant Cugat del Valles (ES); Salvador Sanchez Ribes, Sabadell (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 510 days.

(21) Appl. No.: 16/071,167

(22) PCT Filed: May 12, 2016

(86) PCT No.: PCT/US2016/031973
§ 371 (c)(1),
(2) Date: Jul. 19, 2018

(87) PCT Pub. No.: WO2017/196323
PCT Pub. Date: Nov. 16, 2017

(65) Prior Publication Data
US 2021/0170686 A1 Jun. 10, 2021

(51) Int. Cl.
*B29C 64/35* (2017.01)
*B33Y 10/00* (2015.01)
*B33Y 30/00* (2015.01)
*B33Y 40/00* (2020.01)
*B29C 64/214* (2017.01)
*B29C 64/165* (2017.01)

(52) U.S. Cl.
CPC ............ *B29C 64/35* (2017.08); *B29C 64/165* (2017.08); *B29C 64/214* (2017.08); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

| 4,411,706 | A | 10/1983 | Wallace et al. |
| 6,739,696 | B2 | 5/2004 | Arai et al. |
| 8,469,692 | B2 | 6/2013 | Kritchman et al. |
| 9,073,264 | B2 | 7/2015 | Abe et al. |
| 2002/0079601 | A1 | 6/2002 | Russell |

(Continued)

FOREIGN PATENT DOCUMENTS

| EP | 1029684 | 12/1999 |
| WO | WO-1998028124 | 10/1988 |
| WO | WO-2011049143 | 3/2013 |

OTHER PUBLICATIONS

"How to Unclog Epson Printhead Nozzles"; InkMagic International Ltd.; Webpage retrieved on Mar. 14, 2016.

*Primary Examiner* — Yung-Sheng M Tsui
(74) *Attorney, Agent, or Firm* — HP Inc. Patent Department (57) ABSTRACT

Examples Include apparatuses and methods for generating three-dimensional objects. An example apparatus comprises an agent distributor and a wiping element disposed at a service location. The apparatus further comprises at least one airflow component disposed proximate the service location to generate airflow across the wiping element to reduce build material collection on the wiping element.

20 Claims, 8 Drawing Sheets

(56) References Cited

U.S. PATENT DOCUMENTS

| | | |
|---|---|---|
| 2005/0225007 A1 | 10/2005 | Lai et al. |
| 2009/0179952 A1 | 7/2009 | Hibbard et al. |
| 2010/0247703 A1* | 9/2010 | Shi .................... B29C 64/165 |
| | | 425/375 |
| 2010/0247742 A1 | 9/2010 | Shi et al. |
| 2013/0297063 A1* | 11/2013 | Kritchman ............ B29C 64/321 |
| | | 700/120 |
| 2015/0174824 A1* | 6/2015 | Gifford ................ B29C 64/182 |
| | | 425/183 |
| 2015/0231832 A1 | 8/2015 | Shi et al. |

* cited by examiner

AIRFLOW COMPONENT

BACKGROUND

Additive manufacturing systems that generate three-dimensional objects on a layer-by-layer basis may be used for producing three-dimensional objects. Examples of additive manufacturing systems include three-dimensional printing systems. The quality of objects produced by additive manufacturing systems may vary widely based on the type of additive manufacturing technology used.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DESCRIPTION

Examples provided herein include apparatuses, processes, and methods for generating three-dimensional objects. Apparatuses for generating three-dimensional objects may be referred to as additive manufacturing apparatuses. As will be appreciated, example apparatuses described herein may correspond to three-dimensional printing systems, which may also be referred to as three-dimensional printers. In an example additive manufacturing process, a layer of build material may be formed in a build area, a fusing agent may be selectively distributed on the layer of build material, and energy may be temporarily applied to the layer of build material. As used herein, a build layer may refer to a layer of build material formed in a build area upon which agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include powder-based build material, where powder-based build material may comprise wet and/or dry powder-based materials, particulate materials, and/or granular materials. In some examples, the build material may be a weak light absorbing polymer. In some examples, the build material may be a thermoplastic. Furthermore, as described herein, agent may comprise fluids that may facilitate fusing of build material when energy is applied. In some examples, agent may be referred to as coalescing or fusing agent. In some examples, agent may be a light absorbing liquid, an infrared or near infrared absorbing liquid, such as a pigment colorant. In some examples at least two types of agent may be selectively distributed on a build layer.

Example apparatuses may comprise an agent distributor. In some examples, an agent distributor may comprise a printhead or printheads (e.g., a thermal ejection based printhead, a piezoelectric ejection based printhead, etc.). An agent distributor may be coupled to a scanning carriage, and the scanning carriage may move along a scanning axis over the build area. In one example, printheads suitable for implementation in commercially available inkjet printing devices may be implemented as an agent distributor. In other examples, an agent distributor may comprise other types of fluid ejection devices that selectively eject small volumes of fluid.

In some, examples, an agent distributor may comprise at least one printhead that comprises a plurality of fluid ejection dies arranged generally end-to-end along a width of the agent distributor. In some examples, the at least one printhead may comprise a plurality of printheads arranged generally end-to-end along a width of the agent distributor. In such examples, a width of the agent distributor may correspond to a dimension of a build area. For example, a width of the agent distributor may correspond to a width of a build area. As will be appreciated, an agent distributor may selectively distribute agent on a build layer in the build area concurrent with movement of the scanning carriage over the build area. In some example apparatuses, the agent distributor may comprise nozzles through which agent may be selectively ejected. In such examples, the agent distributor may comprise a nozzle surface in which a plurality of nozzle orifices may be formed.

In some examples, apparatuses may comprise a build material distributor to distribute build material in the build area. A build material distributor may comprise, for example, a wiper blade, a roller, and/or a spray mechanism. In some examples, a build material distributor may be coupled to a scanning carriage. In these examples, the build material distributor may form build material in the build area as the scanning carriage moves over the build area along the scanning axis to thereby form a build layer of build material in the build area.

In some example additive manufacturing apparatuses, distribution and processing of build material may lead to build material particles being dispersed in the air within the apparatus. As will be appreciated, the build material particles may collect on various surfaces in the apparatus. For example, build material may collect on the agent distributor. As will be appreciated, build material that collects on the agent distributor may lead to issues during operation of the agent distributor to selectively distribute agent. For example, build material may block or partially block a nozzle of an agent distributor.

Accordingly, some examples include a wiping element that may be used to wipe a nozzle surface of an agent distributor. The wiping, element may be disposed at a service location of the apparatus, where the service location may be spaced apart from the build area. To remove build material from the agent distributor, the agent distributor may be moved to the service location. Engagement of the wiping element and the nozzle surface of the agent distributor and movement of the wiping element and/or agent distributor may cause removal of build material from the nozzle surface. As will be appreciated, the wiping element may thereby remove build material temporarily adhered to the nozzle surface of the agent distributor. Example wiping elements may comprise textile based wiping elements, rubber or synthetic rubber wiping elements (e.g., rubber wipers), fibrous wiping elements, and/or other such materials that may engage a nozzle surface and remove build material therefrom without causing abrasive damage to the nozzle surface.

However, build material may also collect on the wiping element. Build material collection on the wiping element may reduce the effectiveness of the wiping element. In some cases, build material collection on the wiping element may even cause operational issues with the agent distributor. For example, build material collected on a surface of the wiping element may be pushed into nozzle orifices of the agent distributor. Example apparatuses described herein may comprise at least one airflow component disposed proximate the service location. In these examples, the at least one airflow component may generate airflow away from the service location such that collection of build material in the service location may be reduced. In some examples, the at least one airflow component may generate airflow across the wiping element such that collection of build material on the wiping element may be reduced. As used herein, example airflow components may comprise fans, air pumps, compressors, blowers, pipes, nozzles, filters, and/or connections. In some examples, it will be appreciated that various types and combinations of airflow components may be implemented to generate airflow as described herein.

Figure 1:
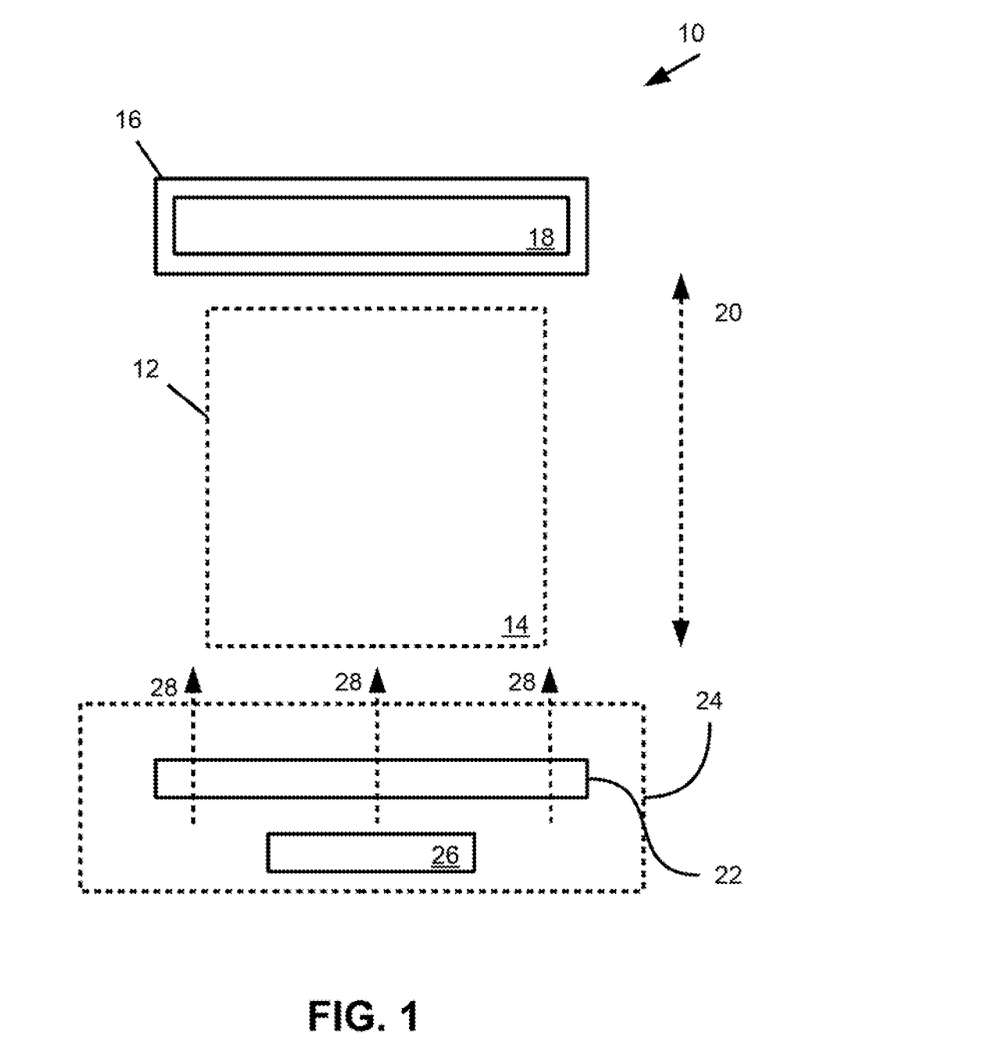
FIG. 1 provides a block diagram of some components of an example apparatus for generating three-dimensional objects.

Turning now to the figures, and particularly to FIG. 1, this figure provides a block diagram of some components of an example apparatus 10 for generating a three-dimensional object. In this example, the apparatus 10 may comprise a build material support 12 having a surface that corresponds to a build area 14. In this example, the build material support 12 is illustrated with dashed lines to reflect that a build material support may not be included in some examples. In such examples, a build material support may be included during performance of an additive manufacturing process by the apparatus; however, the build material support may be removable. As will be appreciated, layers of build material may be formed in the build area 14 on the surface of the build material support 12.

Furthermore, in this example, the apparatus 10 comprises a scanning carriage 16 and an agent distributor 18 coupled to the scanning carriage 16, The scanning carriage 16 may move bi-directionally along a scanning axis 20 over the build area 14. As will be appreciated, movement of the scanning carriage 16 facilitates movement of the agent distributor 18. The agent distributor 18 may distribute agent in the build area 14 during movement of the scanning carriage 16 over the build area 14.

Furthermore, the apparatus 10 comprises a wiping element 22 that is disposed at a service location 24. In addition, the apparatus 10 comprises at least one airflow component 26 disposed proximate the service location 24, In this example, the at least one airflow component 26 generates airflow 28 (also illustrated with dashed line, where the dashed arrows 28 correspond to an example direction of airflow) in a direction from the service location 24 to the build area 14 and across the wiping element 22. As will be appreciated, the airflow 28 generated by the at least one airflow component 26 may reduce the collection of build material in the service location due to build material dispersed in the air, of the apparatus 10, In some examples, the airflow 28 generated by the at least one airflow component 26 reduces collection of build material on the wiping element 22. As shown, the service location 24 may be spaced apart from the build area 14 such that build material of build layers formed in the build area 14 may be spaced apart from the service location 24. In this example, the scanning carriage 16 and agent distributor 18 may move along the scanning axis 20 to the service location 24. When the agent distributor 18 is positioned at the service location 24, the wiping element 22 may engage the agent distributor 18, and the wiping element 22 and/or agent distributor 18 may move during engagement therebetween to thereby remove build material from a nozzle surface of the agent distributor 18.

Figure 2:
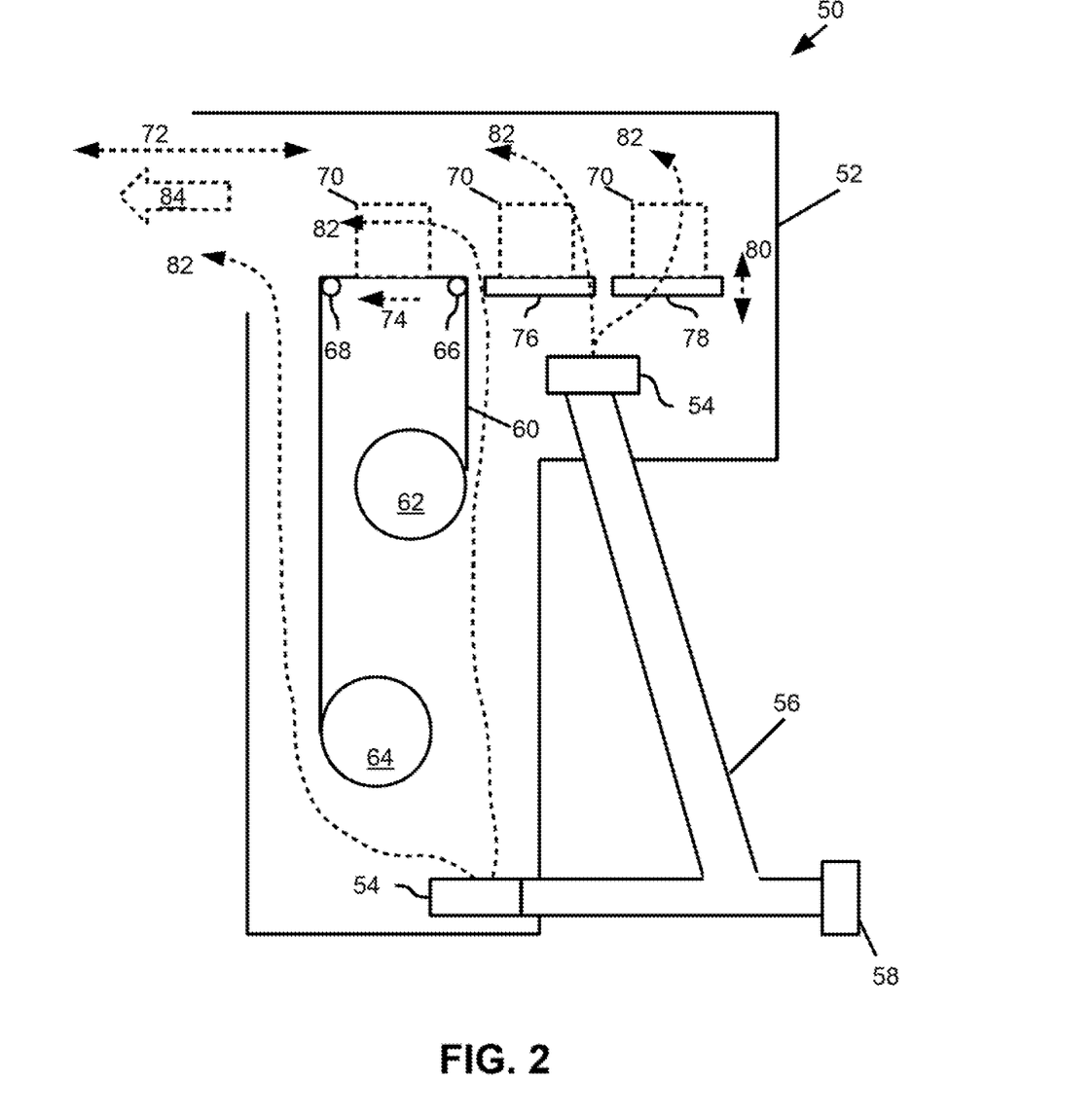
FIG. 2 provides a block diagrams of some components of an example apparatus for generating three-dimensional objects.

FIG. 2 provides a block diagram that illustrates some components of an example apparatus 50 for generating a three-dimensional object. In this example, components disposed at a service location of the example apparatus 50 are illustrated. In this example, the service location may be partially enclosed by a housing 52 in which airflow generation components 54 may be disposed. In this example, the airflow components 54 are connected to an air inlet 56 that may be connected to an air source. As shown, the air inlet 56 may be coupled to a filter 58 that may filter air fed to the airflow components 54 via the air inlet 56. In this example, the apparatus 50 comprises a wiping element 60 disposed at the service location, where the wiping element 60 comprises an elongate flexible member that may be supported and/or conveyed via rollers 62, 64, 66, 68. As will be appreciated, in other examples, more or less rollers 62-68 may be implemented. Furthermore, it will be appreciated that other types of material guides (such as elongate rods, low friction plates, etc.) may be implemented in some examples.

FIG. 2 illustrates an agent distributor 70 in dashed line at various positions in the service location. As discussed previously, the agent distributor 70 may move along a scanning axis 72 over a build area. In this example, it will be appreciated that the agent distributor 70 may move along a scanning axis 72 to the service location from the build area, and furthermore, the agent distributor may move along the scanning axis 72 to various positions in the service location. For example, the agent distributor may be positioned proximate the wiping element 60 such that the wiping element 60 engages a nozzle surface of the agent distributor 70. In this example, during engagement of the nozzle surface of the agent distributor 70 and the wiping element 60, the wiping element may be moved such that a portion of the wiping element that engages the nozzle surface may move along a wiping axis 74. As will be appreciated, movement of the wiping element 60 may cause removal of build material on the nozzle surface of the agent distributor 70. In this example, rotation of at least one of the rollers 62, 64 may cause movement of the wiping element 60. As will be appreciated, the wiping element 60 may be stored in a roll such that a clean wiping element is supplied from a first roller 62 and a used wiping element is stored at a second roller 64.

In addition, in this example, the apparatus 50 comprises a drop detector 76 and an agent distributor cap 78 disposed in the service location. As shown, the agent distributor 70 may be moved to a position proximate the drop detector 76. When positioned proximate the drop detector 76, the drop detector may detect drop ejection for nozzle orifices of the nozzle plate of the agent distributor 70. Furthermore, the agent distributor 70 may be moved to a position proximate the agent distributor cap 78. The agent distributor cap 78 may be movable along an engagement axis 80 such that the agent distributor may be moved to engage the nozzle surface of the agent distributor 70. Therefore, the agent distributor cap may selectively engage and thereby cover the nozzle surface of the agent distributor 70 to thereby cap the nozzle orifices of the agent distributor 70.

In this example, the airflow, generation components 54 generate airflow out of the partially enclosed housing 52. Example airflow for the apparatus is illustrated in dashed, airflow lines 82. However, it will be appreciated that the example airflow lines merely illustrate an approximate direction of airflow in the partially enclosed housing 52 at the service location. In combination, the airflow generated by the airflow generation components 54 is in a direction across the wiping element 62 and from the service location towards the build area. While the build area is not illustrated in the example apparatus 50 of FIG. 2, an overall airflow direction 84 is illustrated in dashed line which corresponds to a direction from the service location to the build area (not shown). Accordingly, examples described herein may comprise airflow components that generate airflow away from the service location and components disposed at the service location such that build material dispersed in air proximate the build area may not collect in the service location and components disposed at the service location.

Figure 3A:
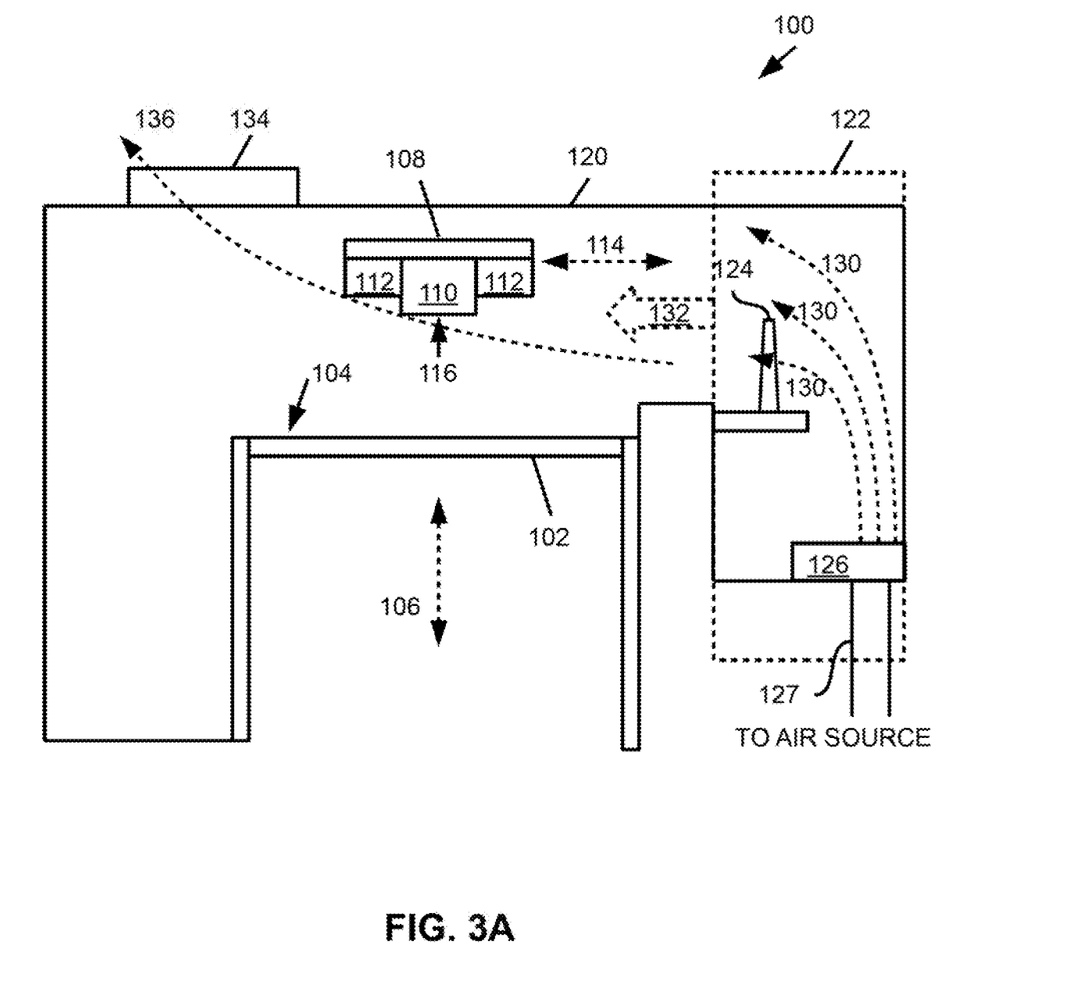
FIG. 3A provides a block diagram of some components of an example apparatus for generating three-dimensional objects.

FIG. 3A provides a block diagram that illustrates some components of an example apparatus 100 for generating a three-dimensional object. In this example, the apparatus 100 comprises a build material support 102 having a build surface 104 corresponding to a build area upon which build layers of build material may be formed. In this example, the build material support 102 may move along a build axis 106, In particular, as build layers of build material are formed on the build surface 104 of the build material support 102, the build material support may be moved along the build axis 106.

Figure 3B:
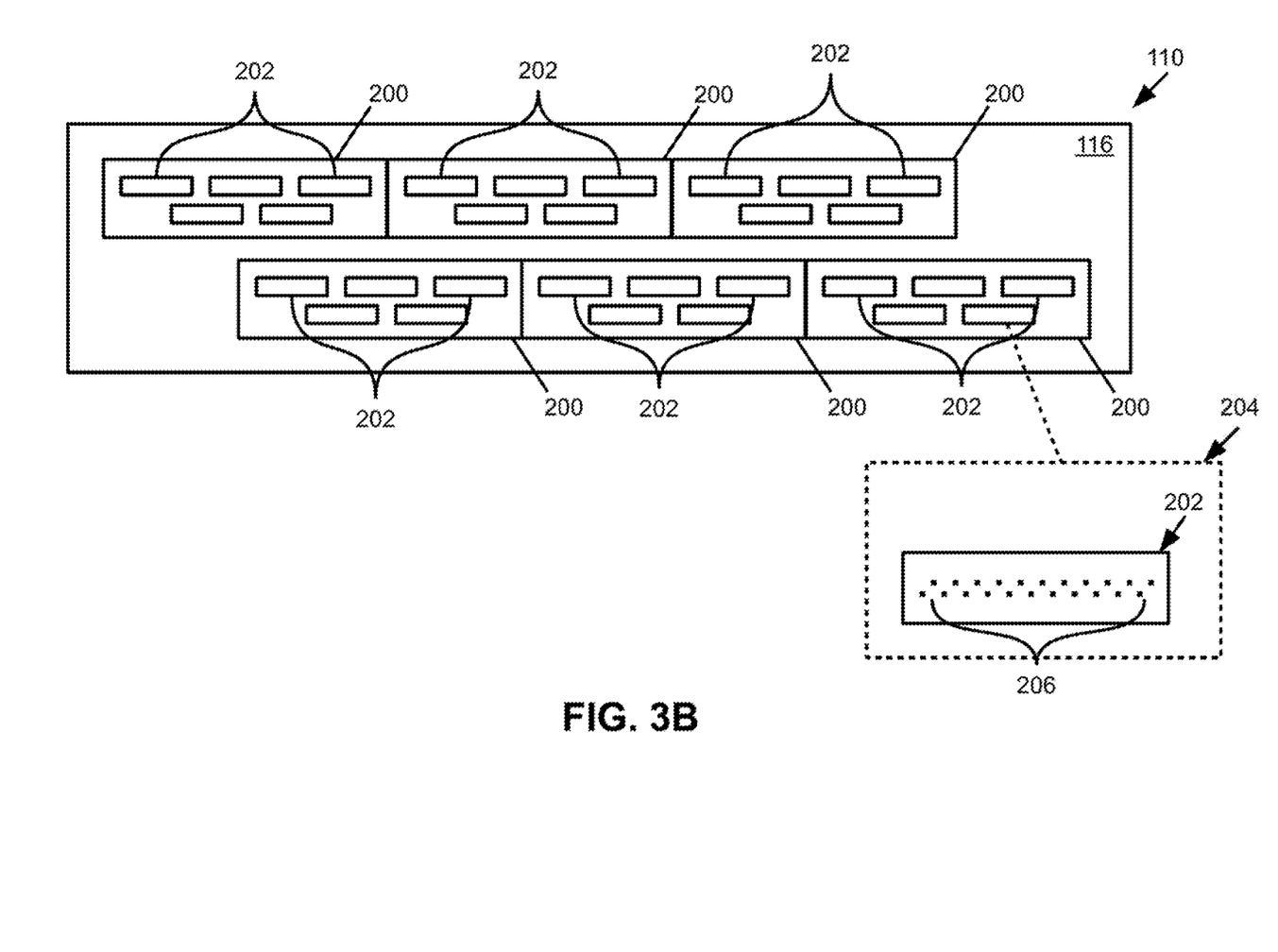
FIG. 3B provides a block diagram of some components of the example agent distributor of FIG. 3A.

Furthermore, the example apparatus 100 comprises a scanning carriage 108 and an agent distributor 110 coupled to the scanning carriage 108. In this example, energy sources 112 are also coupled to the scanning carriage 108. The scanning carriage 108, agent distributor 110, and energy sources 112 may move bi-directionally along a scanning axis 114 over the build area. As discussed in other examples, the agent distributor 110 has a nozzle surface 116 into which a plurality of nozzle orifices may be formed. FIG. 3B illustrates further detail regarding an example agent distributor 110 and the nozzle surface 116 thereof.

Continuing with FIG. 3A, the build area of the apparatus 100 corresponds to the build surface 104 of the build material support 112. As discussed, build material may be formed in build layers in the build area, and such distribution may cause dispersal of build material into the air within the apparatus 100. In the example of FIG. 3A, the apparatus 100 comprises a housing 120 in which the components thereof may be disposed. Accordingly, it will be appreciated that the ambient environment (and the air thereof) within the housing 120 may have particulate of build material dispersed therein. As discussed, such build material may collect on various surfaces and components in the apparatus 100, To remove build material that may collect (e.g., temporarily adhere) to the nozzle surface 116 of the agent distributor 110, the scanning carriage 108 may move to a service location 122 of the apparatus 100 that is spaced apart from the build area. To remove build material from the nozzle surface 116, the nozzle surface 116 of the agent distributor 110 may engage with a wiping element 124 of the apparatus 100 disposed at the service location 122. In this example, the wiping element 124 may comprise a wiper blade (also referred to as a wiper). In this example, the agent distributor 110 may be moved along the scanning axis 114 at the service location while the nozzle surface 116 is engaged with the wiping element 124 such that build material may be removed from the nozzle surface 116.

Furthermore, the apparatus 100 comprises at least one airflow generation component 126 disposed at the service location 122. As discussed with regard to previous examples, the at least one airflow component 126 generates airflow across the wiping element 124 and in a direction from the service location 122 to the build area. In this example, the at least one airflow component 126 may be connected to an air source via an air inlet 127, In the example some example airflow lines 130 are illustrated in dashed line. As shown, the airflow lines 130 are in a direction across the wiping element and from the service location 122 to the build area. A combined airflow 132 is illustrated that reflects a general airflow generated by the at least one airflow component 126 from the service location 122 to the build area.

In this example, the apparatus 100 further comprises an air outlet 134 that is spaced apart from the service location 122. In this example, the air outlet is disposed on and forms a passage through the housing 120 which may facilitate venting of air from the apparatus 100. In the example, an example airflow direction 136 is illustrated by a dashed line. Generally, the overall airflow of the apparatus 100 is based at least in part on the positioning and operation of the at least one airflow component 126 and the positioning of the air outlet 134. In this example, the direction of airflow is generally from the service location 122 across the wiping element 124 towards the build area. As shown, the direction of airflow is across the build area from the service location 122 and through the air outlet 134. As illustrated by way of the example in FIG. 3A, some apparatuses described herein may implement an airflow therein in a direction from an air inlet disposed at a service location to an air outlet spaced apart from the service location. As will be appreciated, examples may comprise airflow components to generate airflow in the described manner.

As will be appreciated, FIG. 3A illustrates an example airflow that may be generated within an example apparatus. In particular, in FIG. 3A, airflow 130, 132, 136 may be generated from the service location 122 to the air outlet 136 across the build area of the build surface 104. As will be appreciated, some examples comprise generating airflow from the service location to an air outlet, where the air outlet is disposed across the build area from the service location to thereby reduce build material collection in the service location. In some examples, the air outlet may comprise a build material collection component that may collect build material particles dispersed in the air flowing therethrough. For example, an example air outlet may comprise a filter to collect build material flowing through the air outlet to exit the apparatus. In some examples similar to the example of FIG. 3A, a direction of, airflow may be from an air inlet disposed proximate the service location to an air outlet that is spaced apart from the air inlet. In such examples, the air outlet may be disposed across a build area and/or other components that may supply and/or retain build material (e.g., a build material supply platform, a build material supply receptacle, an excess build material supply tray, etc.).

Turning now to FIG. 3B, as discussed above, this figure provides additional detail for the nozzle surface 116 of the agent distributor 110 of FIG. 3A. Some example agent distributors may comprise at least one fluid ejection device, where the fluid ejection device may comprise at least one fluid ejection die. In turn, a fluid ejection die may comprise a plurality of nozzles that may be operated to eject drops of fluid therefrom. Each nozzle may have a nozzle orifice through which drops of fluid may be ejected by operation of a fluid ejector disposed in a nozzle proximate the nozzle orifice. In such examples, a surface into which the nozzle orifices may be formed may be referred to as a nozzle surface.

The example agent distributor 110 of FIGS. 3A-B comprises a plurality of fluid ejection devices 200. In this example, the fluid ejection devices 200 are arranged in a generally end-to-end arrangement along a width of the agent distributor 110. As will be appreciated, in some examples the width of the agent distributor may correspond to a dimension of the build area—e.g., the width of the agent distributor may correspond to a width of the build area. In turn, the arrangement of fluid ejection devices may correspond to a dimension of the build area. Furthermore, as shown in FIG. 3B, in some examples, the fluid ejection devices may be arranged in a staggered and overlapping manner along the width of the agent distributor 110.

In this example, each fluid ejection device 200 comprises a plurality of fluid ejection dies 202. As shown, the fluid ejection dies 202 may be arranged in a generally end-to-end arrangement along a width of the fluid ejection die 200. In addition, the fluid ejection dies 202 may be arranged in a staggered and overlapping manner along the width of the fluid ejection device 200. As shown in a detailed view 204 of FIG. 3B, each fluid ejection die 202 may comprise nozzle orifices 206 formed therein through which fluid may be selectively ejected. In example apparatuses for generating a three-dimensional object, it will be appreciated that agent may be selectively distributed by selective ejection of agent via such nozzle orifices. As shown in the example illustrated in the detail view 204, the nozzle orifices 206 may be arranged in a staggered arrangement along a width of the fluid ejection die 202.

Therefore, in the example of FIG. 3B, the agent distributor 110 may comprise fluid ejection devices 200, each fluid ejection device 200 may comprise fluid ejection dies, and each fluid ejection die 202 may have nozzle orifices formed therein. As will be appreciated, the nozzle surface 116 of the agent distributor may be formed at least in part by approximately planar surfaces of the fluid ejection devices 200, which in turn may be formed at least in part by approximately planar surfaces of the fluid ejection dies 202.

It will be appreciated that the example shown in FIG. 3B is merely an example implementation. In other examples, an agent distributor may comprise more or less fluid ejection devices, Additionally, in other examples, a fluid ejection device of an agent distributor may comprise more or less fluid ejection dies. Similarly, in other examples, a fluid ejection die may comprise more or less nozzle orifices. Moreover, it will be appreciated that other arrangements of fluid ejection devices and fluid ejection dies may be implemented in other examples. For example, an agent distributor may comprise one fluid ejection device that comprises one fluid ejection die. In this example, it will be appreciated that the fluid ejection device and the fluid ejection die may have a width that corresponds to a dimension of the build area. As another example, an agent distributor may comprise three fluid ejection devices. As another example, a fluid ejection device may comprise more than five fluid ejection dies. Accordingly, it will be appreciated that examples described herein may comprise at least one fluid ejection device. Furthermore, it will be appreciated that examples described herein may comprise at least one fluid ejection die.

Figure 4:
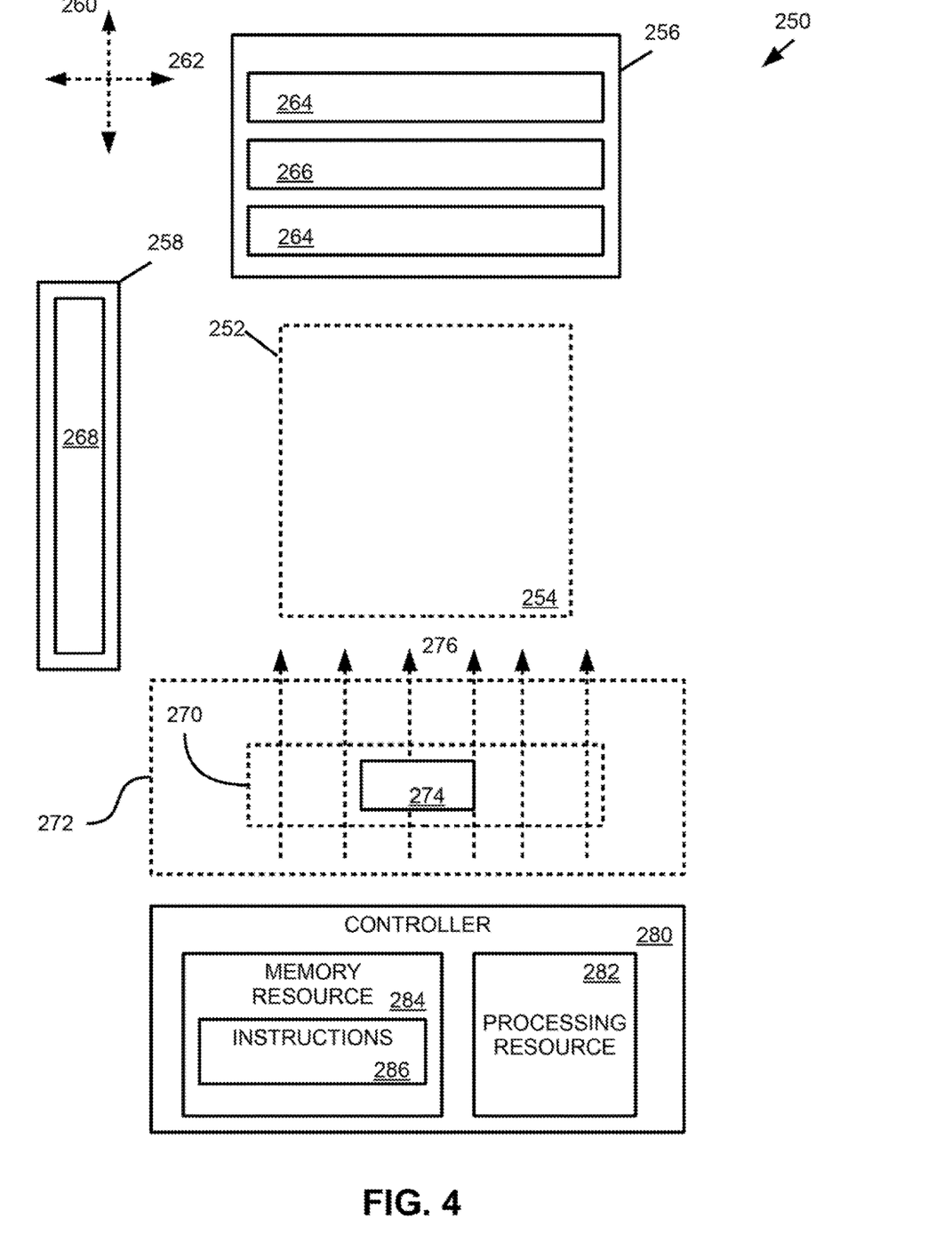
FIG. 4 provides a block diagram of some components of an example apparatus for generating three-dimensional objects.

FIG. 4 provides a block diagram that illustrates some components of an example apparatus 250 for generating a three-dimensional object. In this example, the apparatus 250 may comprise a build material support 252. In some examples, the build material support 252 may not be included in the apparatus 252; hence, the build material support 252 is illustrated in dashed line. As discussed previously, the build material support 252 may have a build surface that corresponds to a build area 254 in which layers of build material may be sequentially formed and fused.

The example apparatus 250 comprises a first scanning carriage 256 and a second scanning carriage 258. In this example, the first scanning carriage 256 may move bi-directionally over the build area 254 along a first scanning axis 260, and the second scanning carriage 258 may move bi-directionally over the build area 254 along a second scanning axis 262. As will be appreciated, the first scanning axis 260 is approximately orthogonal to the second scanning axis 262. Furthermore, the first scanning axis 260 and the second scanning axis 262 are approximately parallel to a plane of the build surface of the build material support 252.

The apparatus 250 comprises energy sources 264 and an agent distributor 266 coupled to the first scanning carriage 256. Accordingly, as the first scanning carriage 256 moves along the first scanning axis 260, the apparatus 250 may selectively distribute agent in the build area 254 on a topmost build layer with the agent distributor 266. Similarly, as the first scanning carriage 256 moves bi-directionally along the first scanning axis 260, the apparatus 250 may emit energy via the energy sources 264 to apply energy to a build layer in the build area 254.

The apparatus 250 comprises a build material distributor 268 coupled to the second scanning carriage 258. Accordingly, as the second scanning carriage 258 moves along the second scanning axis 262, the apparatus 250 may form a build layer of build material in the build area 254 with the build material distributor 268. As will be appreciated, the example arrangement of the build material distributor 268, energy sources 264, and/or agent distributor 266 may be different in other examples. In another example, a build material distributor and an agent distributor may be coupled to a common scanning carriage. Other examples may comprise other arrangements. Similarly other example apparatuses may include more or less energy sources, more agent distributors, and/or more build material distributors.

In addition, the apparatus 250 comprises a wiping element 270 disposed at a service location 272. In this example, the apparatus comprises one wiping element; however, it will be appreciated that other examples may comprise more or less wiping elements. Furthermore, the apparatus comprises at least one airflow component 274 disposed at the service location 272. In this example, the wiping element 270 is illustrated in dashed line to illustrate that the airflow component 274 may be disposed under the wiping element 270. The scanning, carriage 256 and agent distributor 266 are moveable to the service location 272. When the agent distributor 266 is positioned at the service location 272, the agent distributor 266 may engage with the wiping element 270. As discussed previously, movement of the agent distributor 266 and/or wiping elements 270 while engaged therewith may cause removal of build material from a nozzle surface of the agent distributor 266. In this example, an example airflow direction 276 (illustrated in dashed line) is shown. As will be appreciated the at least one airflow component 274 generates the airflow in a direction from the service location 272 towards the build area 254 and across the wiping element 270.

As shown, the apparatus 250 further comprises a controller 280, where the controller is connected to the first scanning carriage 256, the second scanning carriage 258, the energy sources 264, the agent distributor 266, the build material distributor 268, the wiping element 270, and/or the at least one airflow component 274. Therefore, the controller 280 may control operation of the first scanning carriage 256, the second scanning carriage 258, the energy sources 284, the agent distributor 266, the build material distributor 268, the wiping element 270, and/or the at least one airflow component 274. As will be appreciated, the controller 280 may control operations of various components by electrical actuation thereof. For example, the controller 280 may electrically actuate the first scanning carriage 256 to move by transmitting an electrical control signal to an electric motor of the first scanning carriage 256.

As shown, the controller 280 comprises t least one processing resource 282 and a memory resource 284. The processing resource 282 may comprise at least one general purpose data processor and/or at least one specialized data processor. For example, a processing resource may comprise a central processing unit (CPU), a graphics processing unit (GPU), an application-specific integrated circuit (ASIC), a controller, and/or other such configurations of logical components for data processing.

A memory resource may comprise random access memory (RAM) devices as well as other types of memory (e.g. cache memories, non-volatile memory devices, read-only memories, mass-storage resources, etc.). As will be appreciated, a memory resource may be a computer readable and/or machine-readable storage medium (e.g., RAM, ROM, erasable programmable read-only memory (EPROM), electrically erasable programmable read-only memory, flash memory or other solid state memory technology, portable compact disc memory, or other optical storage, or any other medium that may be used to store executable instructions and information).

Therefore; as described herein, a controller may be any combination of hardware and programming to implement the functionalities described with respect to a controller and/or a method. In some examples described herein, the combinations of hardware and programming may be implemented in a number of different ways. For example, the programming for the controller may be processor executable instructions stored on a non-transitory machine-readable storage medium and the hardware for the controller may include a processing resource to execute those instructions. In these examples, an apparatus implementing such controller may include the machine-readable storage medium storing the instructions and the processing resource to execute the instructions, or the machine-readable storage medium may be separately stored and accessible by the apparatus and the controller. In some examples, a controller may be implemented in circuitry.

The memory resource 284 comprises instructions 286, where the instructions 286 are executable by the processing resource 282. Execution of the instructions 286 may cause the processing resource 282 and/or apparatus 250 to perform the functionalities, processes, and/or sequences of operations described herein.

For example, execution of the instructions 286 by the processing resource 282 may cause the controller to control movement of the scanning carriages 256, 258. In some examples, execution of the instructions 286 may cause the controller 280 to control the agent distributor 266 to selectively distribute agent in the build area. In addition, execution of the instructions 286 may cause the controller to control the at least one airflow component 274 to generate airflow as described herein.

Figure 5:
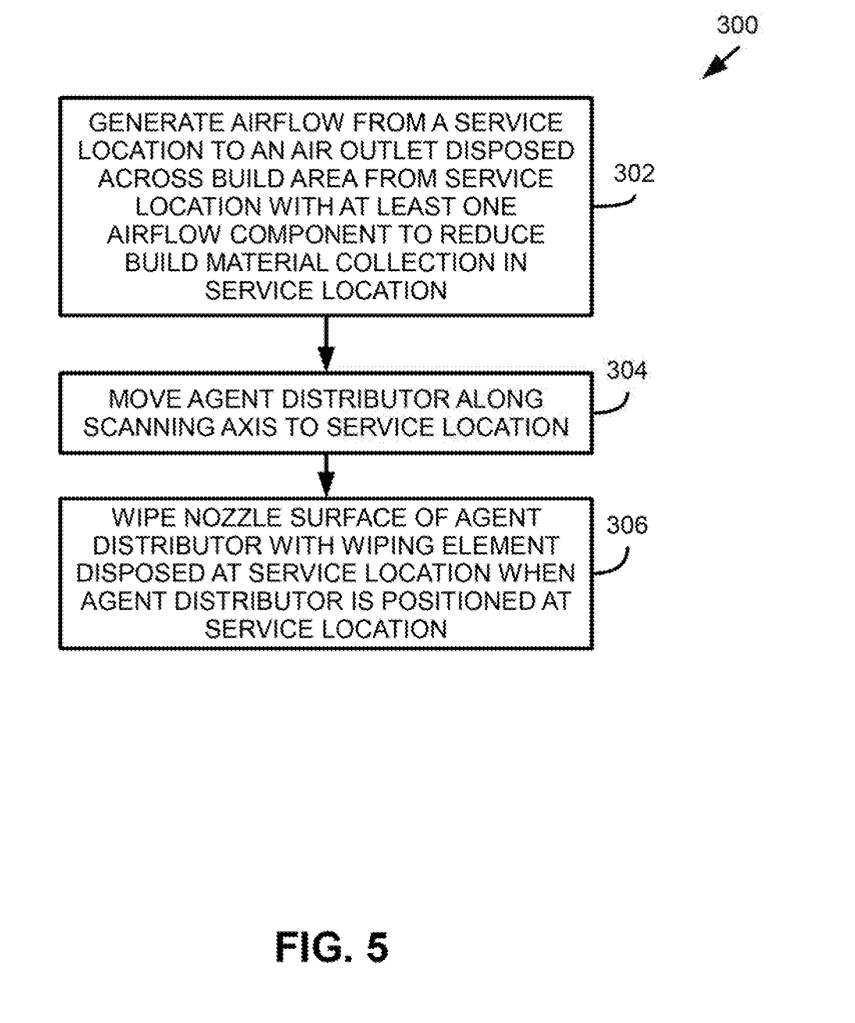
FIG. 5 provides a flowchart that illustrates a sequence of operations that may be performed by an example apparatus.
Figure 6:
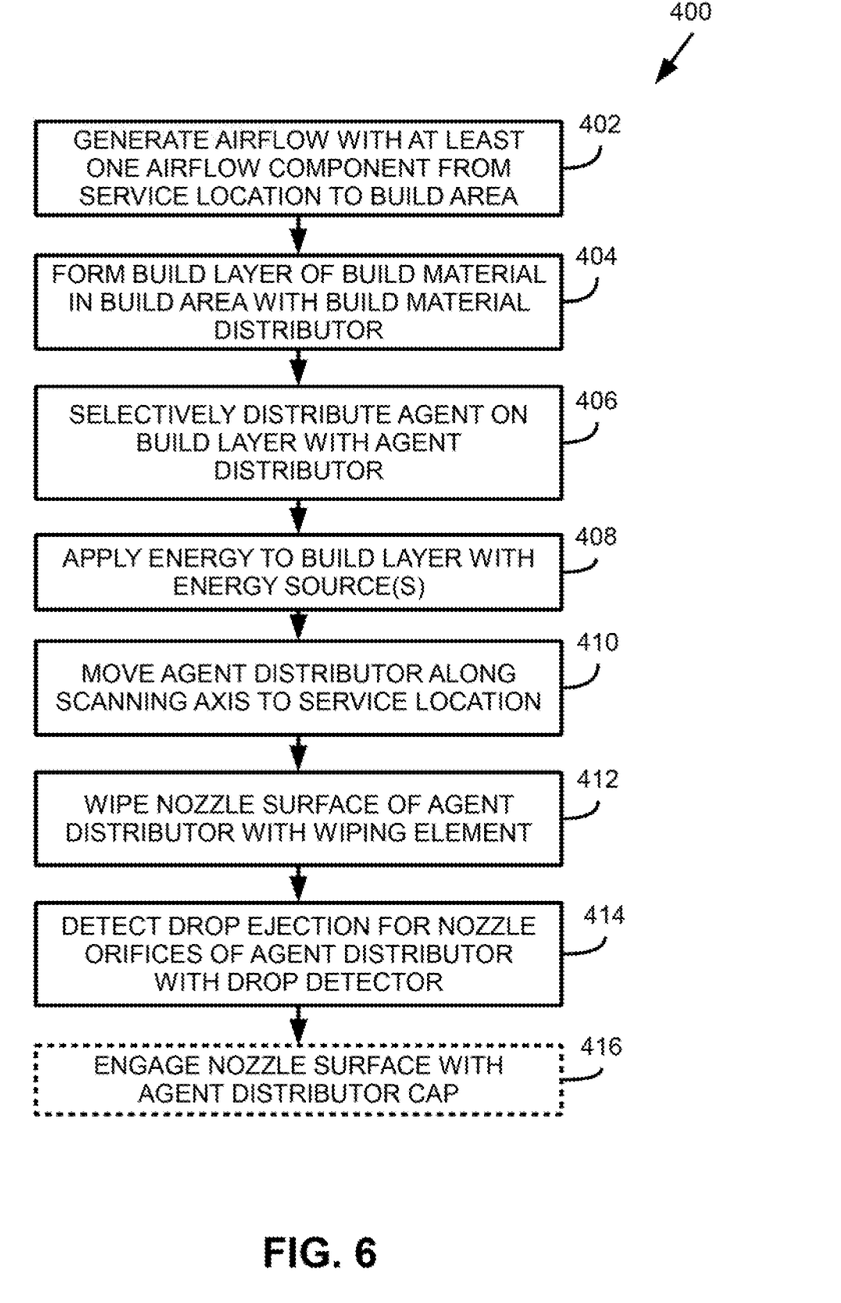
FIG. 6 provides a flowchart that illustrates a sequence of operations that may be performed by an example apparatus.
Figure 7:
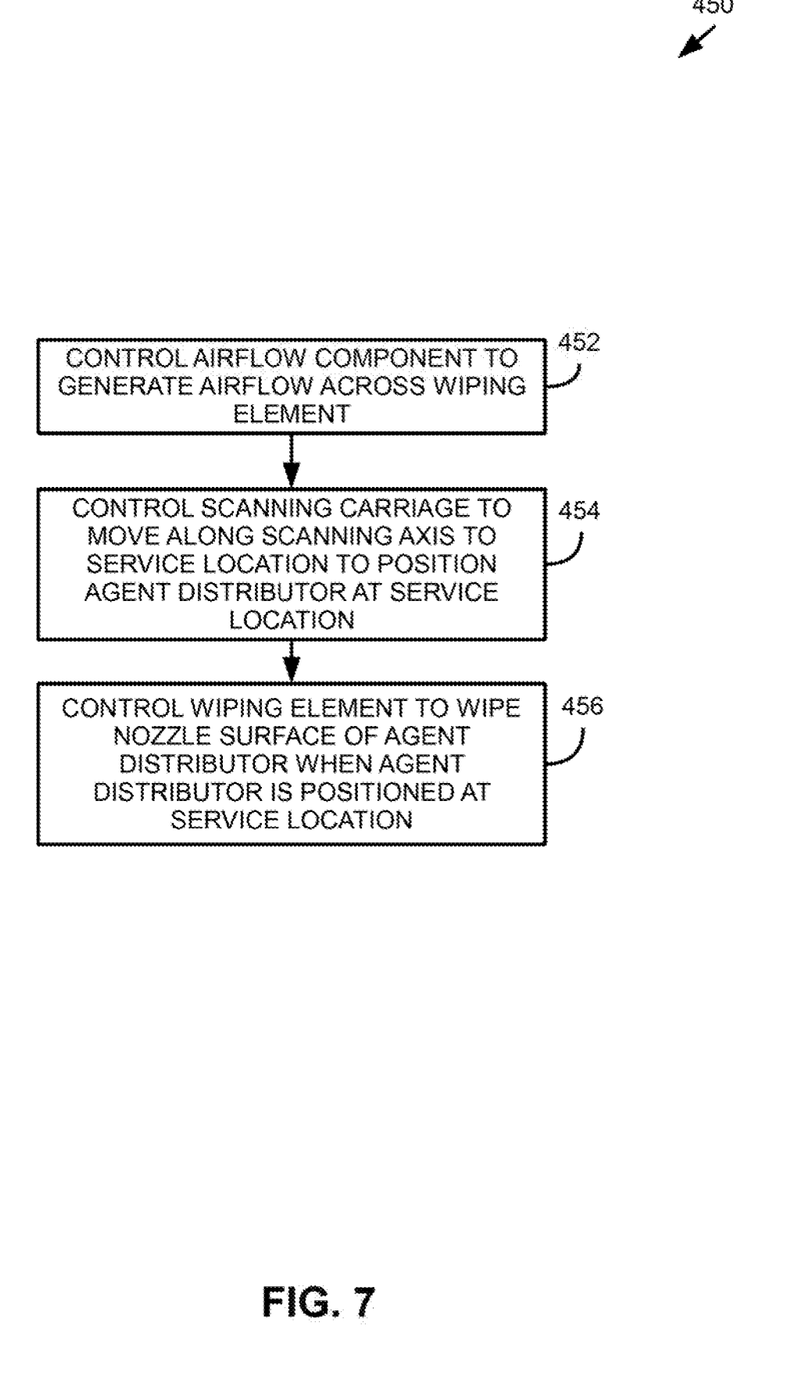
FIG. 7 provides a flowchart that illustrates a sequence of operations that may be performed by an example apparatus.

FIGS. 5-7 provide flowcharts that provide example sequences of operations that may be performed by an example apparatus and/or a controller thereof to perform example processes and methods as described herein. In some examples, some operations included in the flowcharts may be embodied in a memory (such as the memory resource 284 of FIG. 4) in the form of instructions that may, be executable by a processing resource to cause an apparatus and/or controller to perform the operations, corresponding to the instructions. Additionally, the examples provided in FIGS. 5-7 may be embodied in computing devices, machine-readable storage mediums, processes, and/or methods. In some examples, the example processes and/or methods disclosed in the flowcharts of FIGS. 5-7 may be performed by a controller implemented in an apparatus.

FIG. 5 is, a flowchart 300 that illustrates an example sequence of operations that may be performed by an example apparatus for generating a three-dimensional object. In this example, the apparatus, with at least one airflow component, may generate airflow from a service location of the apparatus to a build area of, the apparatus, where the airflow may be across a wiping element that is disposed at the service location, to thereby reduce build material collection in the service location (block 302). The apparatus may move an agent distributor along a scanning axis to the service location (block 304), and a nozzle surface of the agent distributor may be wiped with the wiping element when the agent distributor is positioned at the service location (block 306).

FIG. 6 is a flowchart 400 that illustrates an example sequence of operations that may be performed by an example apparatus for generating a three-dimensional object. In this example, airflow may be generated from a service location of the apparatus to a build area of the apparatus with at least one airflow component that is disposed at the service location (block 402). A build layer of build material may be formed in the build area with a build material distributor (block 404). Agent may be selectively distributed on the build layer with an agent distributor (block 406). Energy may be applied to the build layer with at least one energy source (block 408). The agent distributor may be moved along a scanning axis to the service location (block 410) such that the agent distributor may engage a wiping element disposed at the service location. The nozzle surface of the agent distributor may be wiped with the wiping element (block 412). Drops of agent may be detected for each nozzle orifice of the agent distributor with a drop detector disposed at the service location (block 414).

In some examples, after generation of a three-dimensional object, nozzle orifices of the agent distributor may be capped to prevent debris or other materials from entering the nozzle orifices. Accordingly, as shown in FIG. 6, in some examples, the nozzle surface of the agent distributor may be engaged with an agent distributor cap disposed at the service location (block 416) to thereby cap the nozzle surface of the agent distributor if generation of the three-dimensional object has been completed.

Furthermore, it may be appreciated that generating airflow with the at least one airflow component, as shown in block 402, may be performed concurrent with some or all of the other operations. In some examples, a controller may control the at least one airflow component to selectively operate concurrent with the performance of at least some of the other operations illustrated in the example. In some examples, generating airflow with the at least one airflow component, as shown in block 402, may be performed during performance of all other operations performed by an apparatus during an additive layer-wise manufacturing process.

FIG. 7 provides a flowchart 450 that illustrates an example sequence of operations that may be performed by an example apparatus and/or a controller thereof. In this example, a controller of the apparatus may control at least one airflow component to generate airflow across a wiping element (block 452). The controller may control a scanning carriage of the apparatus to move along a scanning axis to a service location of the apparatus to thereby position an agent distributor coupled to the scanning carriage at the service location (block 454). The controller may control a wiping element disposed at the service location to wipe a nozzle surface of the agent distributor when the agent distributor is positioned at the service location (block 456). As will be appreciated, in some examples, the at least one airflow component may generate the airflow across the wiping element concurrent with performance of the other operations described herein.

Therefore, example apparatuses and processes described herein reduce a collection of build material in a service location of the apparatus. In such examples, at least one airflow component may be disposed at the service location and implemented to generate airflow away from the service location. In particular, the at least one airflow component may generate airflow in a direction from the service location to a build area of the apparatus Additionally, the at least one airflow component may generate airflow across a wiping element of the apparatus. As will be appreciated, reducing the collection of build material in the service location correspondingly reduces the collection of build material on components disposed at the service location. As will be appreciated, reduction of build material collection at the service location may improve build material removal from a nozzle surface of an agent distributor with a wiping element disposed at the service location. In turn, nozzle orifices of the agent distributor may be less likely to become obstructed due to build material particles collecting in the nozzle orifices. Therefore, examples described herein, may facilitate reduced obstruction of nozzle orifices of an agent distributor, which may correspond to improved performance of various other operations of an additive layer-wise manufacturing process.

While various examples are described herein, elements and/or combinations of elements may be combined acid/or removed for various examples contemplated hereby. For example, the example operations provided herein in the flowcharts of FIGS. 5-7 may be performed sequentially, concurrently, or in a different order. Moreover, some example operations of the flowcharts may be added to other flowcharts, and/or some example operations may be removed from flowcharts. Moreover, some operations of the flowcharts of FIGS. 5-7 may be implemented via control of a controller of various components of an apparatus. Furthermore, in some examples, various components of the example apparatuses of FIGS. 1-4 may be removed, and/or other components may be added. Similarly, in some examples various instructions of stored in memory resources end/or machine-readable storage mediums (such as the memory resource of FIG. 4) may correspond to the example operations of FIGS. 5-7.

The preceding description has been presented to illustrate and describe examples of the principles described. This description is not intended to be exhaustive or to limit these principles to any precise form disclosed. Many modifications and variations are possible in light of the above disclosure.

The invention claimed is:

1. A three-dimensional (3D) printer, comprising:
a build area;
a service location;
a scanning carriage configured to move along a scanning axis over the build area, and to move to the service location spaced apart from the build area;
a printhead coupled to the scanning carriage, the printhead configured to selectively distribute a fluid in the build area, the printhead comprising a nozzle surface having a plurality of nozzle orifices formed therein;
a wiping element disposed at the service location, the wiping element configured to wipe the nozzle surface of the printhead to remove build material adhered thereto; and
at least one airflow component disposed proximate the service location, the at least one airflow component configured to generate airflow across the wiping element to reduce build material collection on the wiping element, the at least one airflow component connected to an air source.

2. The 3D printer of claim 1, further comprising:
an air outlet spaced apart from the service location, wherein the at least one airflow component is to cause airflow from the service location to the air outlet across the build area.

3. The 3D printer of claim 1, further comprising:
a drop detector disposed at the service location, the drop detector to detect drop ejection for each nozzle orifice of the plurality of nozzle orifices; and
a printhead cap disposed at the service location, the printhead cap to selectively engage the nozzle surface of the printhead,
wherein the at least one airflow component is further to cause airflow from the service location to the build area to reduce build material collection on the drop detector and the printhead cap.

4. The 3D printer of claim 1, further comprising:
an air inlet to supply air to the service location; and
at least one air filter to filter air supplied to the service location.

5. The 3D printer of claim 1, further comprising:
a build material distributor to form build layers of build material in the build area; and
at least one energy source.

6. The 3D printer of claim 1, wherein the at least one airflow component comprises a first airflow component and second airflow component, and the first airflow component is disposed under the wiping element.

7. The 3D printer of claim 6, further comprising:
a drop detector disposed at the service location, the drop detector to detect drop ejection for each nozzle orifice of the plurality of nozzle orifices; and
a printhead cap disposed at the service location, the printhead cap to selectively engage the nozzle surface of the printhead,
wherein the second airflow component is disposed proximate the printhead cap and the drop detector.

8. The 3D printer of claim 1, further comprising:
a controller to:
  control the scanning carriage to move to the service location such that the printhead is positioned at the service location;
  control the wiping element to wipe the nozzle surface of the printhead when the printhead is positioned at the service location; and
  control the at least one airflow component to generate airflow.

9. The 3D printer of claim 1, wherein the at least one airflow component comprises at least one fan.

10. A method of a three-dimensional (3D) printer, the method comprising:
  moving a printhead along a scanning axis to thereby position the printhead at a service location of the 3D printer;
  wiping a nozzle surface of the printhead with a wiping element disposed at the service location when the printhead is positioned at the service location; and
  generating airflow, with at least one airflow component connected to an air source, from the service location to an air outlet disposed across the wiping element and build area from the service location to thereby reduce build material collection in the service location.

11. The method of claim 10, further comprising:
  distributing a build layer of build material in the build area with a build material distributor of the 3D printer;
  distributing a fluid on the build layer in the build area with the printhead; and
  applying energy to the build layer in the build area with at least one energy source.

12. The method of claim 10, further comprising:
  detecting drop ejection for each nozzle orifice of the nozzle of the printhead with a drop detector disposed at the service location;
  after wiping the nozzle surface with the wiping element, selectively engaging the nozzle surface of the printhead with a printhead cap disposed at the service location,
  wherein generating airflow from the service location to the air outlet comprises generating airflow across the drop detector and the printhead cap to thereby reduce build material collection on the drop detector and the printhead cap.

13. A three-dimensional (3D) printer, comprising:
a build area;
a service location;
a build material distributor to form build layers of build material in the build area of the 3D printer;
a scanning carriage configured to move along a scanning axis over the build area and to move to the service location;
a printhead coupled to the scanning carriage, the printhead configured to selectively distribute a fluid in the build area, the printhead comprising a nozzle plate having a nozzle surface, the nozzle surface having nozzle orifices formed therein through which to selectively distribute the fluid;
at least one energy source;
a wiping element disposed at the service location, the wiping element configured to wipe the nozzle surface to remove build material adhered thereto; and
at least one airflow component disposed at the service location, the at least one airflow component configured to generate airflow across the wiping element and from the service location to the build area to thereby reduce build material collection at the service location, the at least one airflow component connected to an air source.

14. The 3D printer of claim 13, wherein the wiping element is to move along a wiping axis during engagement with the nozzle surface to thereby wipe the nozzle surface, the 3D printer further comprising:
a controller to:
  control movement of the scanning carriage to the service location to thereby position the printhead at the service location such that the nozzle surface of the printhead engages the wiping element; and
  control the wiping element to move along the wiping axis during engagement with the nozzle surface to wipe the nozzle surface to remove build material adhered thereto.

15. The 3D printer of claim 13, wherein the at least one airflow component comprises a first airflow component disposed under the wiping element at the service location and a second airflow component that is spaced apart from the first airflow component and the wiping element.

16. The 3D printer of claim 2, wherein the air outlet is located above the build area.

17. The 3D printer of claim 1, wherein the wiping element comprises an elongate flexible member that is supported and conveyed via rollers.

18. The 3D printer of claim 1, wherein the at least one airflow component to generate airflow away from the service location to reduce collection of build material in the service location.

19. The 3D printer of claim 18, wherein the airflow generated by the airflow component is to reduce build material dispersed in air proximate the build area from entering the service location.

20. The 3D printer of claim 1, wherein the at least one airflow component to generate a positive pressure airflow out of the service location and into the build area.

* * * * *